United States Patent [19]

Engeler

[11] Patent Number: 5,600,675

[45] Date of Patent: Feb. 4, 1997

[54] ULTRASONIC IMAGER HAVING IMPROVED BANDWIDTH

[75] Inventor: William E. Engeler, Scotia, N.Y.

[73] Assignee: General Electric Company, Schenectady, N.Y.

[21] Appl. No.: 301,746

[22] Filed: Sep. 7, 1994

[51] Int. Cl.[6] .............................. H04L 5/12; H04L 23/02; H04B 1/66
[52] U.S. Cl. ................... 375/261; 375/240; 367/7
[58] Field of Search .................................. 375/261, 260, 375/240; 367/11, 89, 103, 105, 7; 128/661.01

[56] References Cited

U.S. PATENT DOCUMENTS

| | | | |
|---|---|---|---|
| 5,172,343 | 12/1992 | O'Donnell | 367/7 |
| 5,228,006 | 7/1993 | Sheriff | 367/103 |
| 5,228,007 | 7/1993 | Murakami et al. | 367/103 |

*Primary Examiner*—Stephen Chin
*Assistant Examiner*—Hai H. Phan
*Attorney, Agent, or Firm*—Marvin Snyder

[57] ABSTRACT

An ultrasonic imaging system which utilizes two summation channels to provide increased bandwidth employs two demodulation stages in each receive channel. The first demodulator receives digital signals from an analog-to-digital converter and demodulates those signals to baseband, thereby producing an in-phase component and a quadrature component. The in-phase and quadrature components are demodulated by the second demodulator, forming a total of four signals which are filtered and combined to form two sets of complex signals. One set corresponds to the upper or high frequencies and the other set corresponds to the lower frequencies. Each band is treated separately in a subsequent phase rotation. The phase changes reflect those required by the center frequency of each of the subbands. The upper band signals are coherently summed in one summation channel, while the lower band signals are coherently summed in another summation channel. The coherently summed upper and lower band signals are then reconstituted into one composite baseband signal.

23 Claims, 5 Drawing Sheets

5,600,675

ULTRASONIC IMAGER HAVING IMPROVED BANDWIDTH

FIELD OF THE INVENTION

This invention generally relates to digital baseband imaging systems having two summation channels and, more particularly, to a method and an apparatus for improving the bandwidth of such digital baseband imaging systems.

BACKGROUND OF THE INVENTION

While known digital baseband imaging systems, such as of the ultrasonic imaging type, provide a number of features, their performance is limited by practical system considerations. One such limitation lies in the use of phase focusing. Fine focusing delay and dynamic focusing are provided by phase rotation of the real and imaginary parts of the baseband signal rather than by actual delay of the signal. This method provides an exact solution for narrow-bandwidth signals at the central frequency, but generates errors of increasing magnitude as the bandwidth of the signal is increased.

In digital baseband imaging systems having two summation channels, the radiofrequency signals are converted into digital samples by an analog-to-digital converter. These digital samples then undergo a series of demodulations and filtering to generate a complex signal having in-phase and quadrature components. These operations are carried out separately in each receive channel. The echo signals reflected from a particular sample volume arrive at the various transducers at different times. A reception beam from that sample volume is formed by applying precision time delays to the signals received by respective receive channels from the transducer array. Each of these signals is delayed by an amount necessary to form a beam in the given desired direction. This beamforming process comprises two parts: the steering function and the focusing function. The steering function is realized by providing the time delay necessary to steer the beam in a given direction θ with respect to a line normal to the face plane of the transducer array. The focusing function is realized by providing a time-dependent time delay necessary to maintain accurate focus during propagation of the imaging energy pulse through the sample. These delays enable the various signals reflected from each point (R, θ) to be summed into one coherent summation signal.

The quantization of the beam-steering time delay, however, is limited to the discrete time steps of the analog-to-digital converter. In some known systems, the analog-to-digital converters operate with a clock frequency of 40 MHz. The time delays are therefore quantized to steps of 25 nsec. This forms a practical limitation of such systems. If selecting the cycle of a common reference clock were the only method for providing time delay, the resulting image would be poor. However, as already mentioned, these systems further employ phase delay to remove the quantization in time restrictions of the analog-to-digital converters and to improve the overall image quality.

Phase rotation of the demodulated and filtered signals is accomplished by vector rotation of the in-phase and quadrature components of the complex signal. This rotation is fixed in time to provide the basic steering or beamforming direction and is changed in time to provide dynamic focusing of the received beam. This method produces an exact solution for narrow-bandwidth signals at the central frequency, but generates errors of increasing magnitude as the bandwidth of the signal is increased.

In prior art digital baseband imaging systems having two summation channels, two separate phase rotations are performed to provide two separate beams from a single firing of the transducers. The two formed beams are directed relative to each other at different angles. This feature is commonly referred to as two-for-one beamforming. Each channel has its separate schedule of both the initial and the time-dependent phase changes, but both beams utilize the same time-delayed, demodulated and filtered signal. The rotated output signals are separately summed by the left and right summation channels and sent to the system midprocessor for further processing and display.

SUMMARY OF THE INVENTION

One object of the invention is to provide an improved vibratory energy imaging system, such as an ultrasonic imaging system, which utilizes the two summation channels of a conventional design to provide increased bandwidth.

Briefly, in accordance with a preferred embodiment of the invention, each receive channel of an ultrasonic imaging system includes two demodulation stages. The first demodulation stage receives digital signals from an analog-to-digital converter and demodulates those digital signals to baseband, thereby producing an in-phase component and a quadrature component. The in-phase and quadrature components are in turn demodulated by the second demodulation stage to form a total of four signals. These four signals are combined and supplied to low pass filtering means, and the resulting filtered signals are supplied to a complex sample set forming means which forms two sets of complex signals. One set of complex signals corresponds to the upper or high frequencies and the other set corresponds to the lower frequencies. Each frequency band is treated separately in a subsequent phase rotation. The phase changes reflect those required by the center frequency of each of the subbands.

All of the upper band signals are coherently summed in one of the summation channels, e.g., the left summation channel, while all of the lower band signals are coherently summed in the other of the summation channels, e.g., the right summation channel. Then the coherently summed upper and lower band signals are reconstituted to form one composite baseband signal having a bandwidth which is greater than the bandwidth in a conventional system.

Both two-for-one and increased bandwidth modes are possible as options of the same system. The hardware required for the upper band may be configured to operate in the conventional two-for-one mode by bypassing the second demodulation stage. Separate schedules of rotations are required for each mode.

DETAILED DESCRIPTION OF THE PREFERRED EMBODIMENTS

Figure 1:
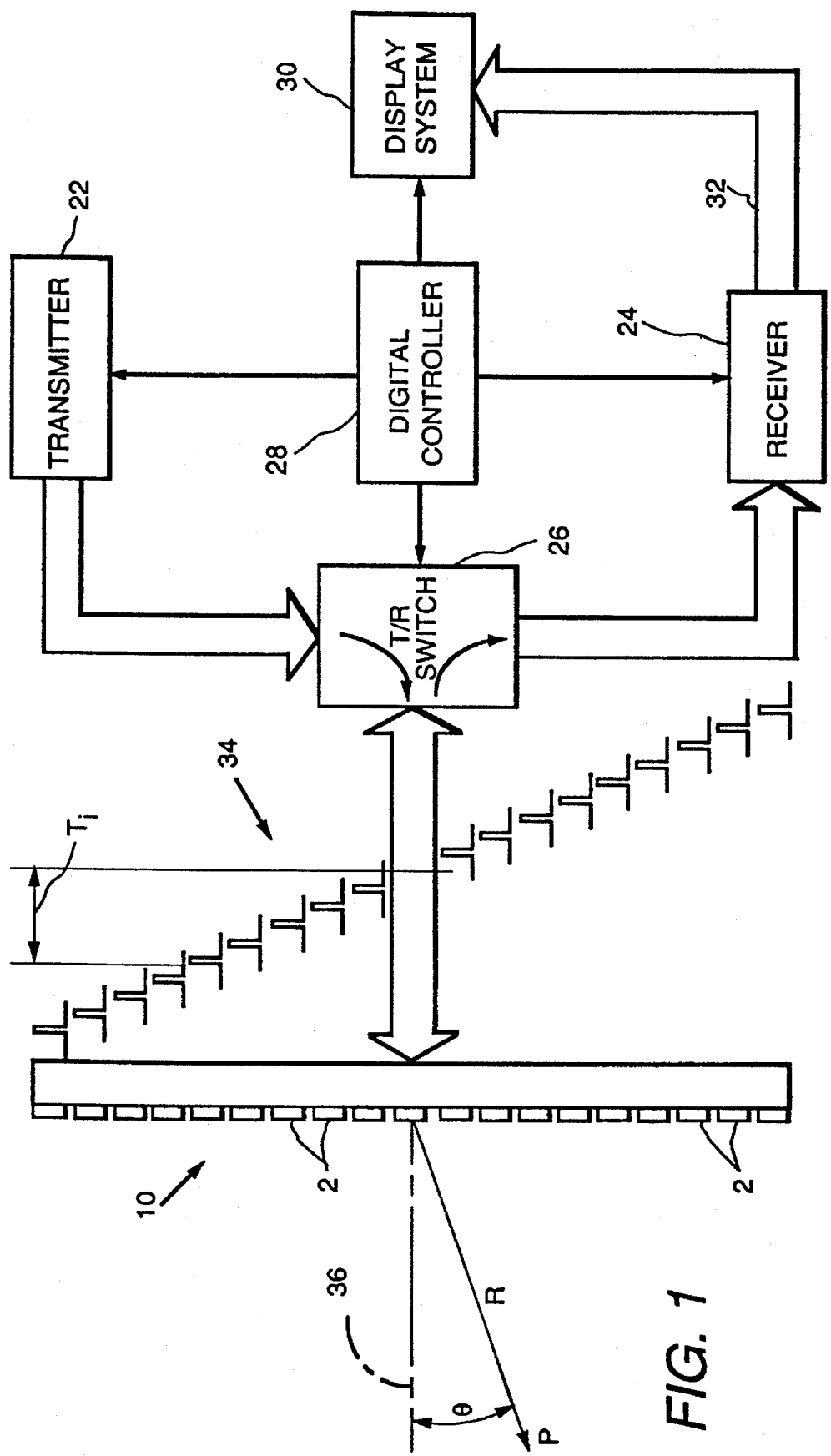
FIG. 1 is a block diagram of a conventional ultrasonic imaging system which can incorporate the invention.

Referring to FIG. 1, an ultrasonic imaging system incorporating the invention includes a transducer array 10 comprised of a plurality of separately driven transducers 2, each of which produces a burst of ultrasonic energy when energized by a pulsed waveform produced by a transmitter 22. The ultrasonic energy reflected back to transducer array 10 from the object under study is converted to an electrical signal by each receiving transducer 2 and applied separately to a receiver 24 through a set of transmit/receive (T/R) switches 26. Transmitter 22, receiver 24 and switches 26 are operated under control of a digital controller 28 responsive to commands by a human operator. A complete scan is performed by acquiring a series of echoes for which switches 26 are set to their transmit positions, transmitter 22 is gated ON momentarily to energize each transducer 2, switches 26 are then set to their receive positions, and the subsequent echo signals produced by each transducer 2 are applied to receiver 24. The separate echo signals from each transducer 2 are combined in receiver 24 to produce a single echo signal which is used to produce a line in an image on a display system 30.

Transmitter 22 drives transducer array 10 such that the ultrasonic energy produced is directed, or steered, in a beam. To accomplish this, transmitter 22 imparts a time delay $T_i$ to the respective pulsed waveforms 34 that are applied to successive transducers 2. By adjusting the time delays $T_i$ appropriately in a conventional manner, the ultrasonic beam can be directed away from axis 36 by an angle θ and/or focused at a fixed range R. A sector scan is performed by progressively changing time delays Ti in successive excitations. Angle θ is thus changed in increments to steer the transmitted beam in a succession of directions. The echo signals produced by each burst of ultrasonic energy reflect from objects located at successive ranges along the ultrasonic beam. The echo signals are sensed separately by each transducer 2, and a sample of the magnitude of the echo signal at a particular point in time represents the amount of reflection occurring at a specific range. Due to differences in the propagation paths between a reflecting point P and each transducer 2, however, these echo signals will not be detected simultaneously and their amplitudes will not be equal. Receiver 24 amplifies the separate echo signals, imparts the proper time delay to each, and sums them to provide a single echo signal which accurately indicates the total ultrasonic energy reflected from point P located at range R along the ultrasonic beam oriented at angle θ.

Figure 2:
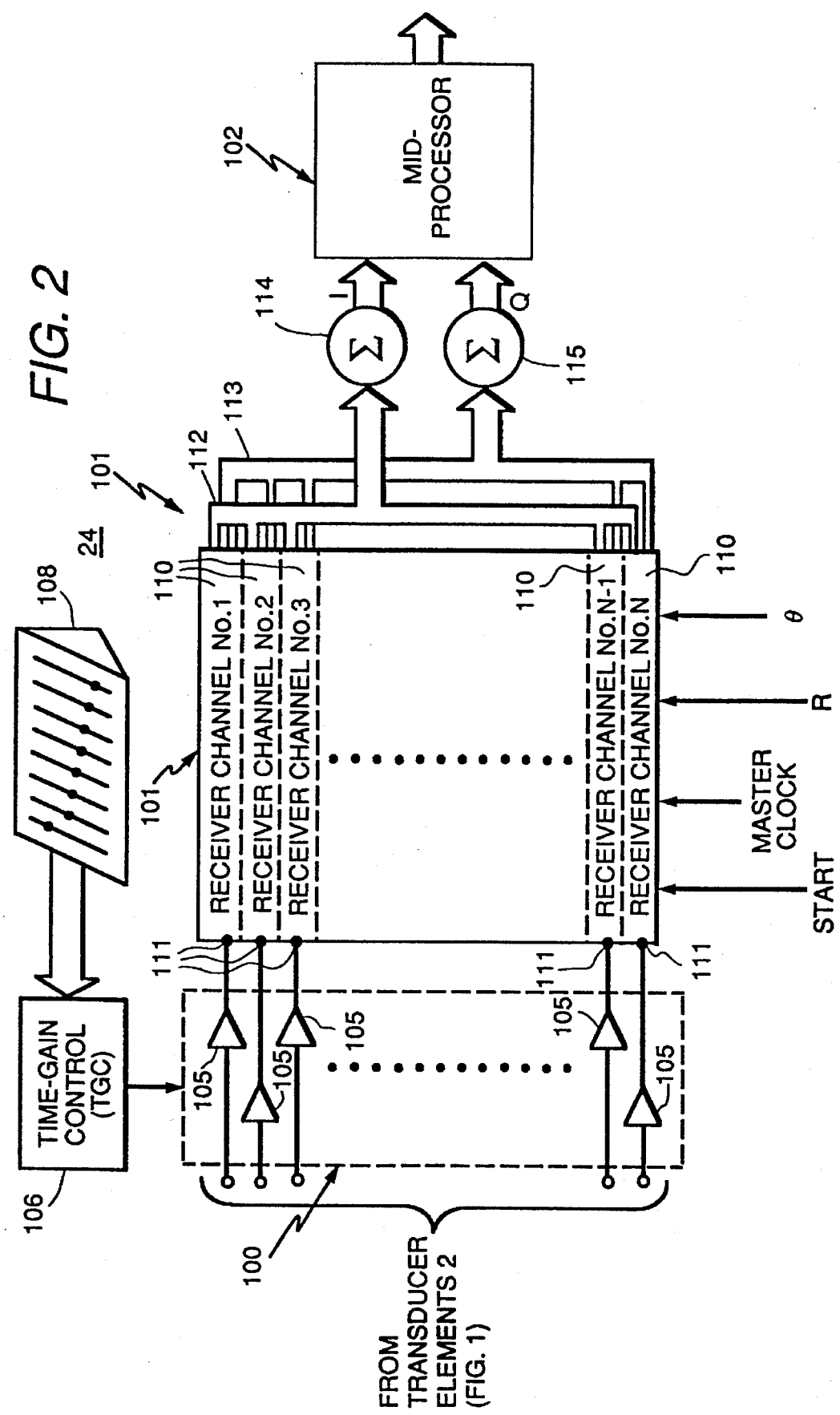
FIG. 2 is a block diagram of a receiver which forms part of the system of FIG. 1.

To simultaneously sum the electrical signals produced by the echoes impinging on each transducer 2, time delays are introduced into each separate transducer channel 110 of receiver 24 (see FIG. 2). The beam time delays for reception are the negative of the transmission time delays when measured from the time of the central element. The time delay of each receiver channel continuously changes during reception of the echo to provide dynamic focusing of the received beam at range R from which the echo signal emanates.

Under direction of digital controller 28, receiver 24 provides delays during the scan such that steering of receiver 24 tracks the direction (angle θ) of the beam steered by transmitter 22 and samples the echo signals at a succession of points P along the beam having ranges R. Thus, each emission of an ultrasonic pulse waveform results in acquisition of a series of data points which represent the ultrasonic energy reflected from a corresponding series of points P located along the ultrasonic beam. Display system 30 receives the series of data points produced by receiver 24 and converts the data into the desired image.

As shown in FIG. 2, receiver 24 comprises three sections: a time-gain control section 100, a receive beamforming section 101 and a mid-processor 102. Time-gain control (TGC) section 100 includes a respective amplifier 105 for each receiver channel 110, and a time-gain control circuit 106. The input of each amplifier 105 is coupled to a respective one of transducers 2 to amplify the echo signal which it receives. The amount of amplification provided by amplifiers 105 is controlled by a time-gain control (TGC) circuit 106, which is adjusted by operation of potentiometers 108.

Each receiver channel 110 of receiver beamforming section 101 receives an analog echo signal from one of amplifiers 105 at an input 111. As described in greater detail in connection with FIG. 3, each amplified analog echo signal is conveyed to a pair of quadrature detectors in the respective receiver channel, where the phases of a mixing reference frequency differ by 90°. The pair of output signals from a low-pass filter in the receiver channel become complex signals (I and Q) with phases that differ by 90°. These signals are produced as a stream of digitized output values at baseband on an I bus 112 and a Q bus 113. Each of these I and Q baseband signals represents a demodulated sample of the echo signal envelope at a specific range R. These samples are delayed such that when they are summed at summing points 114 and 115 with the I and Q samples from each of the other receiver channels 110, the summed signals indicate the magnitude and phase of the echo signal reflected from point P located at range R on the beam steered at angle θ.

While summing points 114 and 115 are shown in FIG. 2 as discrete summers, the summation is typically provided by a combination of summers and time delays. Conventional systems may, for example, employ a pipeline architecture for this purpose. In that architecture the information from each channel is added to sum at the summer. This summed information is then delayed and used in the summation of the following channel. Delays introduced by the pipeline are in steps of the pipeline clock period and may therefore be compensated by the delays provided by a FIFO (i.e., first-in/first-out memory) of each channel, described in greater detail in conjunction with FIG. 3. In addition, the summation may be grouped into partial sums, properly delayed by similar periods and summed into a final pipeline. Details of these architectures are dependent on the design considerations of the system designer. In all instances, the architectures provide the function of summing the information from each range position common to each channel. The term "summation channel" as used herein encompasses all variations of pipeline and non-pipeline summations.

Mid-processor section 102 receives the beam samples from summing points 114 and 115. The I and Q values of each beam sample are signals representing the in-phase and quadrature components of the magnitude of the reflected sound from a point (R, θ).

Figure 3:
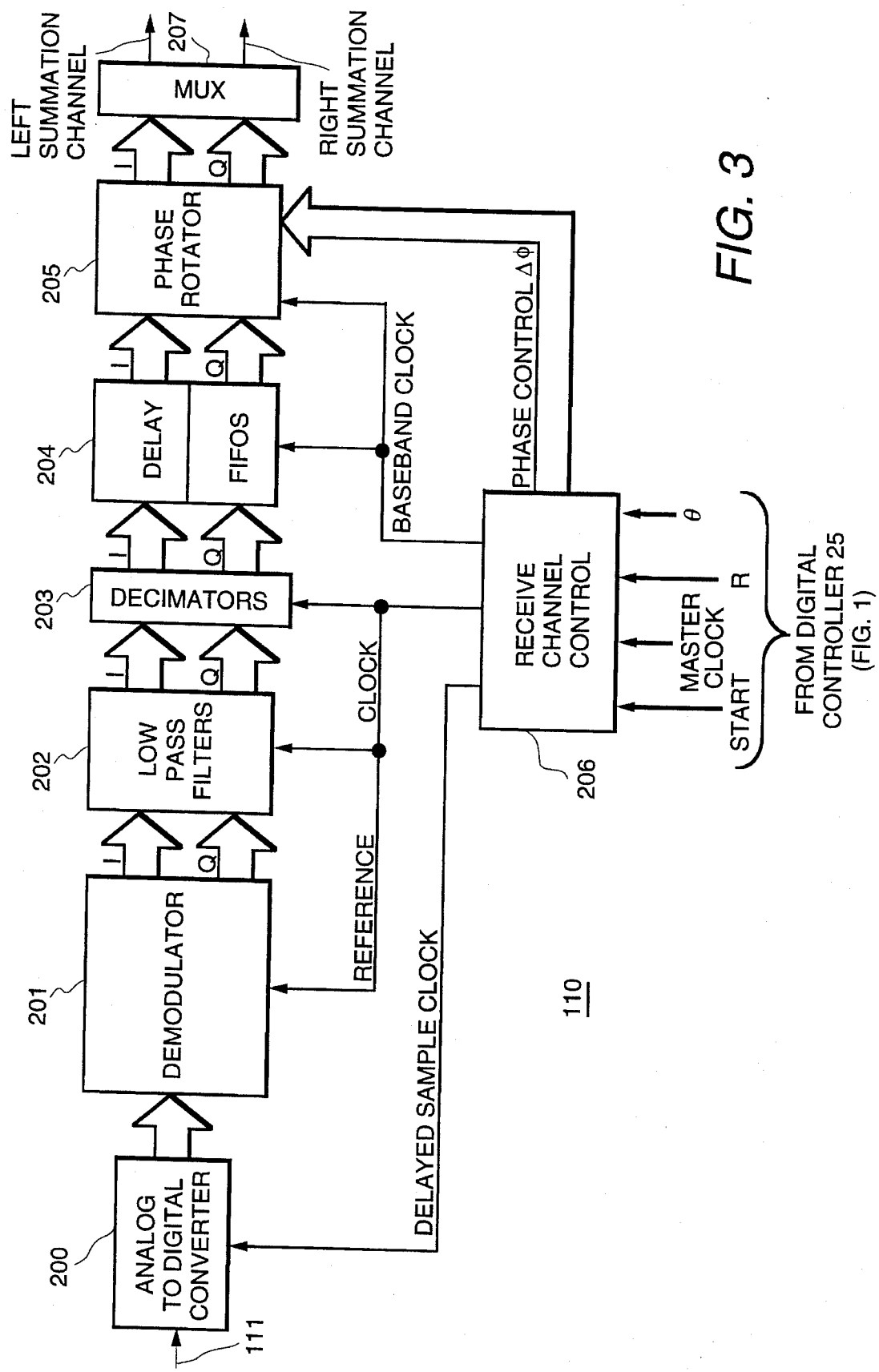
FIG. 3 is a block diagram of a receiver channel which forms part of the receiver of FIG. 2.

As indicated in FIG. 3, each receiver channel is responsive to a START command, a master clock, and a beam angle signal (θ) from digital controller 28 (FIG. 1) to perform the digital beamforming functions which include: sampling the analog input signal at input 111 in an analog-to-digital converter 200; demodulating the sampled signal to baseband in a demodulator 201; filtering out the high-frequency sum signals produced by demodulator 201 with low pass filters 202; reducing the data rate and providing a time delay in steps of the period of the sampling clock in decimators 203; providing a time delay in steps of the reduced data rate in FIFO memories 204; and phase adjusting the resulting digital data stream in phase rotator 205. Receiver channel elements 200–205 are controlled by a receive channel control 206 which produces the required clock and control signals in response to commands from digital controller 28 (FIG. 1).

Analog-to-digital converter 200 samples the analog signal at regular intervals. These samples are provided to demodulator 201, which mixes each sample with a reference signal that is in-phase with, and a reference signal that is in quadrature with, the transmitted ultrasonic carrier. The demodulator reference signals are produced from stored SINE and COSINE tables that are read out of respective read-only memories (ROMs) at receive channel control 206. The SINE value is digitally multiplied by the sampled input signal to produce a demodulated, in-phase I output signal that is supplied to one portion of low pass filters 202, and the COSINE value is digitally multiplied by the same sampled input signal to produce a demodulated, quadrature phase Q output signal that is supplied to a second portion of low pass filters 202. Low pass filters 202 are finite impulse response (FIR) filters designed to pass the baseband frequency but block the higher sum frequencies supplied by demodulator 201. The output signal of each portion of low pass filters 202 is a stream of digital values which indicate the magnitude of the I or Q component of the echo signal envelope.

The rate at which the demodulated I and Q components of the echo signal are sampled is reduced by decimators 203, which also provide a delay in steps (i.e., fractions) of the period of the sampling clock. The echo signal envelope represented by the demodulated and decimated digital samples is then delayed by delay FIFOs 204 and phase-shifted by phase rotator 205 to provide the desired beam steering and beam focusing.

In the two-for-one beamforming mode, two separate phase rotations are performed by phase rotator 205 to provide two separate beams from a single firing of the transducers. The two beams thus formed are phase-rotated relative to each other, and the phase-rotated output signals are multiplexed to left and right summation channels.

In contrast to the-receive channel shown in FIG. 3, the invention utilizes demodulation to split the signal into a high frequency band and a low frequency band. Specifically, each band is centered about a frequency that is either above or below the central frequency of the received signal produced by the transducer by an amount equal to the frequency of a second demodulator frequency (demodulator 303 shown in FIG. 4). These signals are filtered separately (by FIR filters 304 shown in FIG. 4) and phase-rotated by an amount appropriate for their new center band frequencies. The resulting phase-rotated signals are combined in a multiplexer 207 so as to produce output signals representing left and right summation channel output signals of microprocessor 102 (FIG. 2), forming a beam of usable bandwidth greater than heretofore possible. Improvement approaching a factor of two in bandwidth is possible as each channel acts independently.

Figure 4:
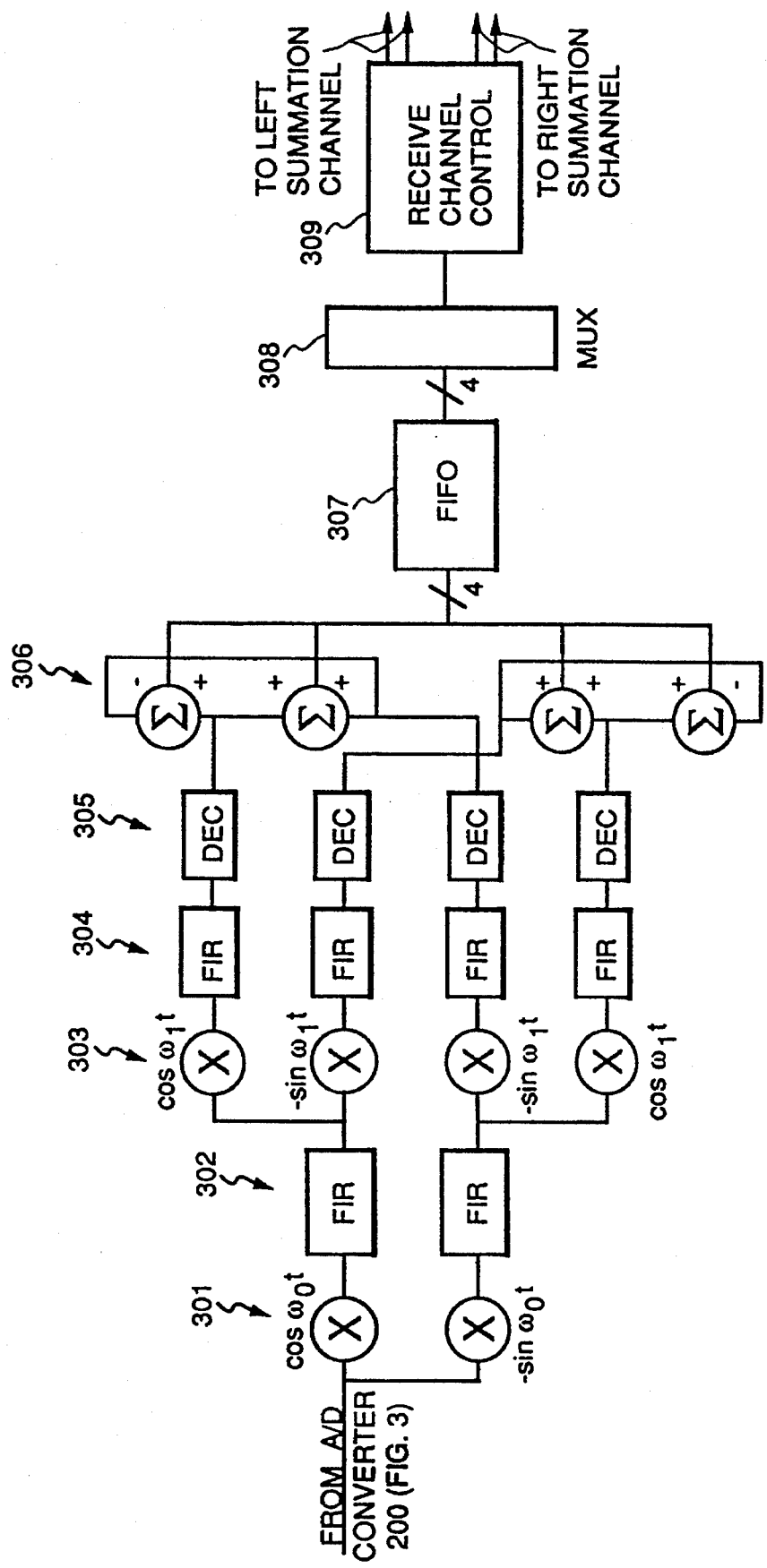
FIG. 4 is a block diagram of a receiver channel having two demodulation stages in accordance with a preferred embodiment of the present invention.

A detailed block diagram of the signal processing in one receive channel in accordance with a preferred embodiment of the invention is shown in FIG. 4. The incoming signal from analog-to-digital converter 200 (shown in FIG. 3) is demodulated to baseband by a first demodulator 301. For illustrative purposes, assume that the signal is centered at 5 MHz (i.e., $\omega_0 = 2\pi \times 5$ MHz). This generates a complex signal which consists of an in-phase and a quadrature signal. The in-phases and quadrature signals are filtered by finite impulse response (FIR) filters 302, and each of the in-phase and quadrature signals is then demodulated by a second demodulator 303. This time the frequency shift is only 1.25 MHz (i.e., $\omega_1 = 2\pi 1.25$ MHz). This forms a total of four signals. Each of the four signals is filtered separately by a respective FIR filter 304 and then decimated by a respective decimator 305. The filtered and decimated signals are formed into two sets of complex (I and Q) signals by summers 306 such that one set is centered at the upper or high frequencies (6.25 MHz) and the other set is centered at the lower frequencies (3.75 MHz). In this example, each set has been filtered so that a bandwidth of 1.8 MHz results. In total, therefore, the signal from 1.95 MHz to 8.05 MHz is represented in the two sets. This provides the imager with a full-width bandwidth of 6.1 MHz. This bandwidth is greater than the bandwidth of a single channel by a factor of 1.7.

As seen in FIG. 4, the two sets of complex signals from summers 306 are supplied to a delay FIFO 307, which in turn supplies the two sets of complex signals, after predetermined time delays, to a multiplexer 308. Each frequency band is treated separately in a subsequent phase rotation, just as the left and right beams are treated separately in a conventional system. However, in the large-bandwidth system according to the present invention, only one beam direction is formed. The phase changes introduced by phase rotator 309 reflect those required by the center frequency (6.25 MHz or 3.75 MHz) of each of the subbands. Since each subband has the bandwidth (3.6 MHz) of the conventional narrow-bandwidth system, the errors introduced by the phase focusing of each subband are no greater then the errors in the conventional system. The phase-rotated first and second sets of complex signals respectively corresponding to the upper and lower frequency bands are supplied to the left and right summation channels respectively.

While individual signal processing structures are shown in FIG. 4, multiplexed structures are possible when a common procedure is employed.

After all of the channels have been coherently summed, the upper and lower band portions of the signal carried by the two summation channels are recombined into one higher resolution signal. This processing requires interpolation, filtering and modulation operations. These are relatively complex signal processing functions, but they need to be performed only once per system, in contrast to those functions that need to take place on a per channel basis.

Figure 5A:
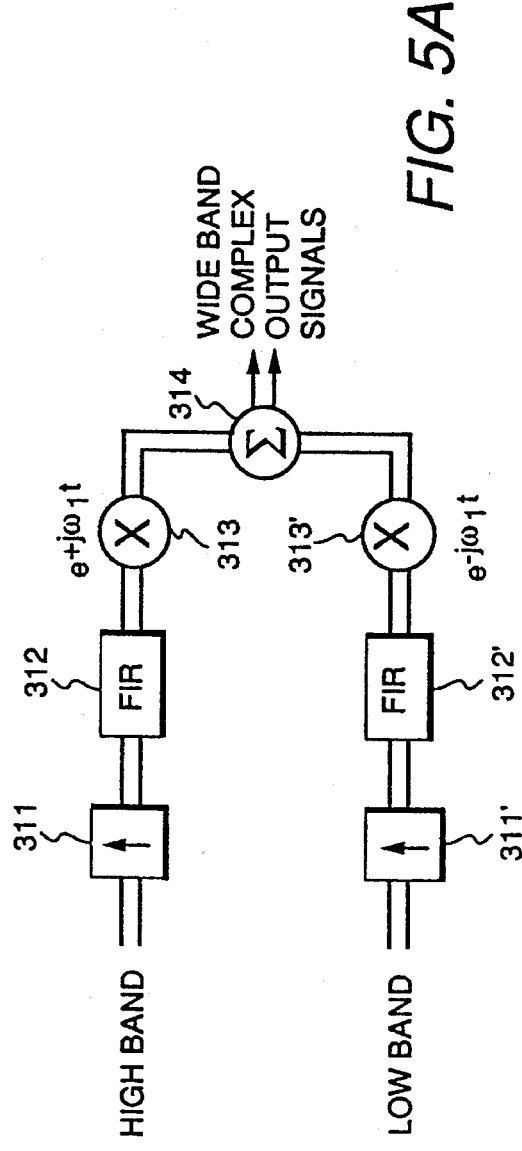
FIGS. 5A and 5B are block diagrams showing the operations used to reconstitute the high- and low-frequency band portions into one composite baseband signal in accordance with alternative preferred embodiments of the present invention.

FIG. 5A is a block diagram illustrating how the high- and low-frequency band portions are reconstituted into one composite baseband signal. This is a midprocessor function. A first pipeline carrying high-frequency band signals has an interpolator 311, an FIR interpolation filter 312 and a modulator 313 coupled in series. A second pipeline carrying low-frequency band signals has an interpolator 311', an FIR interpolation filter 312' and a modulator 313' coupled in series. The interpolators perform one-to-two interpolation, e.g., they increase the data sampling rate from 5 MHz to 10 MHz. The FIR filter provides interpolation filtering and edge shaping of the bands and, in general, is a complex filter. The modulators shift the bands to their proper frequency positions for the combined baseband signals. A summer 314 sums the modulated signals from both pipelines, thereby forming the desired wide-bandwidth complex output signals. The edge shaping ensures uniform response throughout the region of overlap of the two signals in either of the high-frequency or low-frequency bands. The combined signal produced by summer 14 may now be treated just as in coventional systems except that the signal represents a large-bandwidth signal. Further processing (i.e., taking the square root of the sum of the squares of display the resulting large-bandwidth signal.

Figure 5B:
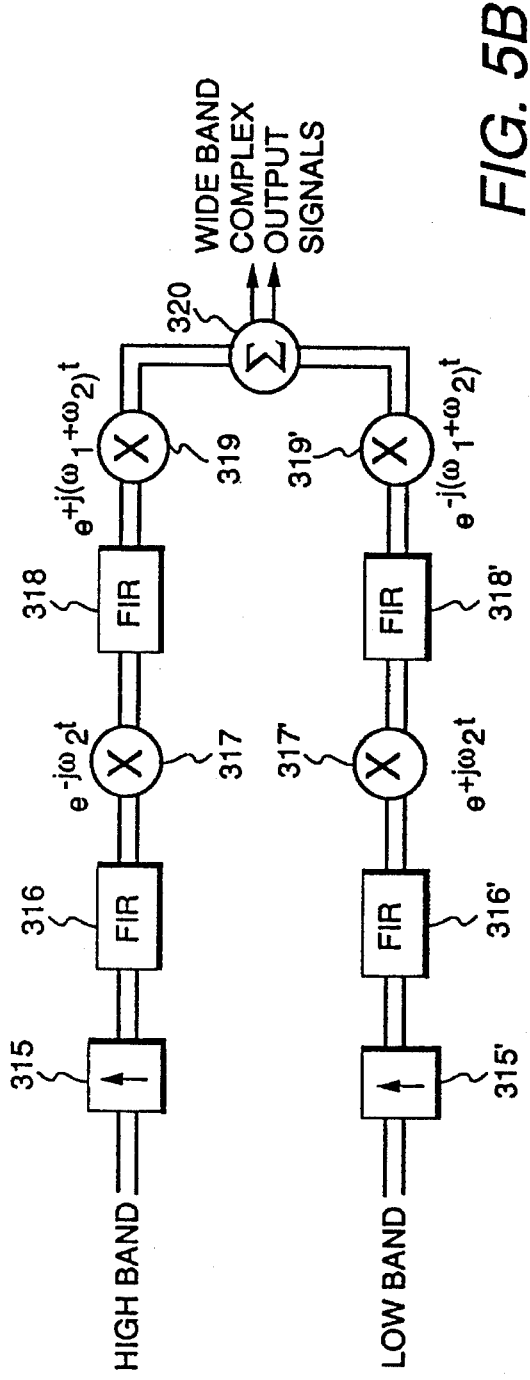

As an alternative to the embodiment of FIG. 5A, the embodiment of FIG. 5B may be used. In this embodiment, one-to-two interpolators 315, 315' are respectively followed by FIR filters 316, 316' of the half-band design. This provides efficient implementation of this filtering function. Next, the frequency bands at the increased sampling rate are shifted in angular frequency by an amount $\omega_2$ by modulators 317, 317' so that a second set of half-band filters 318, 318' may be used to provide the correct edge shaping of the bands. The signals are then shifted to their proper positions in the final combined wideband complex signal by modulators 319, 319'. In each of the high and low frequency bands, the edges that were previously shaped now form the overlapping portion of the signals in those bands. The special feature of the half-band filters, i.e., that the sum of the system transfer function in symmetric regions at either side of the edge center is unity, ensures that the recombined signal has a uniform transfer function across the intersection of the individual signals before they are recombined. In the example given above, $\omega_1=\omega_c/8$ and $\omega_2=\omega_c/16$, where $\omega_c$ is the angular frequency of the 10 MHz clock.

The same hardware required to achieve a large bandwidth, described above, may be reconfigured to operate in the usual two-for-one mode by bypassing the second demodulation stages. A single system may therefore be configured to operate in either the increased bandwidth mode or the two-for-one mode. Separate schedules of phase rotations are required for each of the separate modes.

The above description presents the system having two bands, but in principle, the system may have any number of bands, each with its own phase rotation. Systems of this type, however, rapidly reach the point of diminishing returns if additional hardware is required. Multiplexed systems, on the other hand, require faster operation as additional bands are employed, not additional hardware, and are therefore suitable for operation with additional bands.

While the large-bandwidth mode of operation is particularly useful when employing wide-bandwidth transducers and displays, it is also useful in systems where time-varying signal processing is employed. In that instance, the signal is processed in a wide-bandwidth format prior to forming the summation. After summation a selected narrower bandwidth is extracted from the result. The selected region may be time varying to track the behavior of the sonic signal as it moves deeper into the body.

While only certain preferred features of the invention have been disclosed for the purpose of illustration, many variations and modifications will be readily apparent to those skilled in the art of digital baseband imaging. For example, although a linear array of transducers has been described herein, transducers of other geometries, e.g., multiple rows or annular rings of transducer elements, could be utilized with the present invention. It is, therefore, to be understood that the appended claims are intended to cover all such variations and modifications as fall within the true spirit of the invention.

What is claimed is:
1. A digital baseband imaging system comprising:
a plurality of transducers arranged in a sequence to form an array;
means for selectively operating said transducers in a transmission mode to produce propagating energy pulses from electrical driving signals; and
means for forming a beam from analog electrical detection signals produced in response to detection of reflected energy pulses by said transducers operating in a reception mode, said beamforming means comprising a plurality of receive channels, each of said receive channels being coupled to a corresponding one of said plurality of transducers, respectively, wherein each of said receive channels comprises:
analog-to-digital conversion means for converting said analog electrical detection signals into digital signal samples;
a first demodulation stage for basebanding said digital signal samples to form a first complex sample; and
means for forming first and second sets of complex samples from said first complex sample, said first set of complex samples being centered in a first frequency band and said second set of complex signals being centered in a second frequency band.
2. The digital baseband imaging system as defined in claim 1, wherein said means for forming first and second sets of complex samples comprises:
first low pass filtering means for separately filtering in-phase and quadrature components of said first complex sample;
a second demodulation stage for forming a second complex sample from said filtered in-phase component of said first complex sample and forming a third complex sample from said filtered quadrature component of said first complex sample;
second low pass filtering means for separately filtering in-phase and quadrature components of each of said second and third complex samples; and
complex sample set forming means for forming said first and second sets of complex samples from said filtered in-phase and quadrature components of said second and third complex samples.
3. The digital baseband imaging system as defined in claim 2, wherein said complex sample set forming means comprises:
means for forming the sum of said filtered in-phase components of said second and third complex samples;
means for forming the difference of said filtered in-phase components of said second and third complex samples;
means for forming the sum of said filtered quadrature components of said second and third complex samples; and
means for forming the difference of said filtered quadrature components of said second and third complex samples.
4. The digital baseband imaging system as defined in claim 1, wherein each of said receive channels further comprises multiplexing means for multiplexing said first and second sets of complex samples, phase rotation means coupled to said multiplexing means for producing a phase-rotated first set of complex signals and a phase-rotated second set of complex signals, a first receive channel coupled to receive said phase-rotated first set of complex signals, and a second receive channel coupled to receive said phase-rotated second set of complex signals.

5. The digital baseband imaging system as defined in claim 4, further comprising a left summation channel coupled to a first receive channel output of each of said plurality of receive channels, and a right summation channel coupled to a second receive channel output of each of said plurality of receive channels.

6. The digital baseband imaging system as defined in claim 5, further comprising processing means for recombining said phase-rotated first and second sets of complex signals into a composite wideband signal.

7. The digital baseband imaging system as defined in claim 6, wherein said processing means comprises:

first and second interpolation means respectively coupled to said first and second summation channels;

first and second filtering means respectively coupled to said first and second interpolation means;

first and second modulation means respectively coupled to said first and second filtering means; and means for summing the output signals of said first and second modulation means.

8. The digital baseband imaging system as defined in claim 6, wherein said processing means comprises:

first and second interpolation means respectively coupled to said first and second summation channels;

first and second half-band filtering means respectively coupled to said first and second interpolation means;

first and second frequency shift modulation means respectively coupled to said first and second half-band filtering means;

third and fourth half-band edge shaping filter means respectively coupled to said first and second frequency shift modulation means;

third and fourth frequency shift modulation means respectively coupled to said third and fourth half-band edge shaping filter means; and means for summing the output signals of said third and fourth frequency shift modulation means.

9. The digital baseband imaging system as defined in claim 6, further comprising means for displaying said wideband signal.

10. In a digital baseband imaging system comprising:

a plurality of transducers;

a transmitter for selectively operating said transducers in a transmission mode to produce propagating energy pulses;

a receiver for selectively operating said transducers in a reception mode to produce analog electrical detection signals in response to detection of reflected energy pulses; and a beamformer for forming in a relatively narrow-bandwidth mode a right and a left relatively narrow-bandwidth beam from analog electrical detection signals produced by said transducers in response to detection of receive channels respectively coupled to said plurality of transducers, each of said receive channels comprising:

an analog-to-digital converter for converting said analog electrical detection signals into digital signal samples;

a first demodulation stage for basebanding said digital signal samples to form a first complex sample;

a phase rotator for separately phase-rotating said first complex sample by a first phase angle to form a left phase-rotated complex sample and by a second phase angle to form a right phase-rotated complex sample; and first and second receive channel outputs coupled to said phase rotator such that said first receive channel output receives said left phase-rotated complex sample and said second receive channel output receives said right phase-rotated complex sample;

a left summation channel coupled to the first receive channel output of each of said plurality of receive channels; and a right summation channel coupled to the second receive channel output of each of said plurality of receive channels;

the improvement wherein each of said receive channels further comprises means for forming first and second sets of complex samples from said first complex sample, said first set of complex samples corresponding to a first frequency band and said second set of complex signals corresponding to a second frequency band different from said first frequency band, whereby said beamformer is operable in a wide-bandwidth mode.

11. The digital baseband imaging system as defined in claim 10, wherein said means for forming sets of complex signals comprises:

a first low pass filter for separately filtering in-phase and quadrature components of said first complex sample;

a second demodulation stage for forming a second complex sample from said filtered in-phase component of said first complex sample and forming a third complex sample from said filtered quadrature component of said first complex sample;

a second low pass filter for separately filtering in-phase and quadrature components of each of said second and third complex samples; and complex sample set forming means for forming said first and second sets of complex samples from said filtered in-phase and quadrature components of said second and third complex samples.

12. The digital baseband imaging system as defined in claim 11, wherein said complex sample set forming means comprises:

means for forming the sum of said filtered in-phase components of said second and third complex samples;

means for forming the difference of said filtered in-phase components of said second and third complex samples;

means for forming the sum of said filtered quadrature components of said second and third complex samples; and means for forming the difference of said filtered quadrature components of said second and third complex samples.

13. The digital baseband imaging system as defined in claim 10, wherein each of said receive channels further comprises a multiplexer for multiplexing said first and second sets of complex signals, a phase rotator coupled to said multiplexer for producing a phase-rotated first set of complex signals and a phase-rotated second set of complex signals, a first receive channel coupled to receive said phase-rotated first set of complex signals, and a second receive channel coupled to receive said phase-rotated second set of complex signals.

14. The digital baseband imaging system as defined in claim 13, further comprising a left summation channel coupled to a first receive channel output of each of said plurality of receive channels, and a right summation channel coupled to a second receive channel output of each of said plurality of receive channels.

15. The digital baseband imaging system as defined in claim 14, further comprising processing means for recombining said phase-rotated first and second sets of complex signals into a composite wideband signal.

16. The digital baseband imaging system as defined in claim 15, wherein said processing means comprises:

first and second interpolation means respectively coupled to said first and second summation channels;

first and second filters respectively coupled to said first and second interpolation means;

first and second modulators respectively coupled to said first and second filters; and means for summing the output signals of said first and second modulators.

17. The digital baseband imaging system as defined in claim 15, wherein said processing means comprises:

first and second interpolation means respectively coupled to said first and second summation channels;

first and second half-band filters respectively coupled to said first and second interpolation means;

first and second frequency shift modulators respectively coupled to said first and second half-band filters;

third and fourth edge shaping half-band filters respectively coupled to said first and second frequency shift modulators;

third and fourth frequency shift modulators respectively coupled to said third and fourth half-band edge shaping filters; and means for summing the output signals of said third and fourth frequency shift modulators.

18. A method for increasing the bandwidth of a digital baseband imaging system, said system comprising a plurality of transducers for transmitting energy pulses and detecting returning signals from said pulses reflected by scatterers, a corresponding plurality of receive channels respectively coupled to said plurality of transducers, each of said receive channels having phase rotation means for forming left and right beams from said detected returning signals, a left summation channel for receiving said left beams from the phase rotation means of each of said receive channels, and a right summation channel for receiving said right beams from the phase rotation means of each of said receive channels, said method comprising the steps of:

converting said detected returning signals into digital samples;

basebanding said digital samples to form a first complex sample; and forming first and second sets of complex samples from said first complex sample, said first set of complex samples corresponding to a first frequency band and said second set of complex signals corresponding to a second frequency band.

19. The method as defined in claim 18, further comprising the steps of:

separately phase-rotating said first set of complex samples by a first phase angle to form a phase-rotated first set of complex samples and by a second phase angle to form a phase-rotated second set of complex samples;

providing said phase-rotated first set of complex samples to said first summation channel; and providing said phase-rotated second set of complex samples to said second summation channel.

20. The method as defined in claim 18, wherein the step of forming first and second sets of complex samples comprises:

separately low pass filtering in-phase and quadrature components of said first complex sample;

forming a second complex sample from said filtered in-phase component of said first complex sample;

forming a third complex sample from said filtered quadrature component of said first complex sample; and separately low pass filtering in-phase and quadrature components of said second complex sample and of said third complex sample;

whereby the first and second sets of complex samples are formed from the filtered in-phase and quadrature components of said second and third complex samples.

21. The method as defined in claim 20, wherein the step of forming first and second sets of complex samples comprises:

forming the sum of said filtered in-phase components of said second and third complex samples;

forming the difference of said filtered in-phase components of said second and third complex samples;

forming the sum of said filtered quadrature components of said second and third complex samples; and forming the difference of said filtered quadrature components of said second and third complex samples.

22. The method as defined in claim 19, further comprising the step of recombining said phase-rotated first and second sets of complex signals into a composite wideband signal.

23. The method as defined in claim 22, further comprising the step of displaying said wideband signal.

* * * * *